United States Patent [19]

Lam

[11] Patent Number: 5,412,449
[45] Date of Patent: May 2, 1995

[54] SINGLE-STAGE 3D PHOTOGRAPHIC PRINTER WITH A KEY-SUBJECT ALIGNMENT METHOD

[75] Inventor: Nicholas L. Lam, Chai-Wan, Hong Kong

[73] Assignee: Image Technology International, Inc., Norcross, Ga.

[21] Appl. No.: 68,746

[22] Filed: May 28, 1993

[51] Int. Cl.⁶ .............................................. G03B 27/32
[52] U.S. Cl. ...................................... 355/22; 355/33; 355/53
[58] Field of Search ............................. 355/22, 33, 53

[56] References Cited

U.S. PATENT DOCUMENTS

| | | | |
|---|---|---|---|
| 3,492,913 | 12/1969 | Glenn | 355/33 |
| 3,895,867 | 7/1975 | Lo | 355/77 |
| 4,101,210 | 7/1978 | Lo. | |
| 4,120,562 | 10/1978 | Lo. | |
| 4,903,069 | 2/1990 | Lam. | |
| 5,028,950 | 7/1991 | Fritsch. | |
| 5,036,356 | 7/1991 | Lo. | |
| 5,111,236 | 5/1992 | Lo | 355/22 |

Primary Examiner—Michael L. Gellner
Assistant Examiner—Daniel P. Malley
Attorney, Agent, or Firm—Deveau, Colton & Marquis

[57] ABSTRACT

A 3D printer that uses two video cameras with different magnification powers for acquiring images from 2D negatives for editing and key subject alignment. One video camera takes full view image for key subject selection and picture cropping, the other video camera which is used for acquiring image data for key subject alignment sees only an enlarged section of the image around the key subject. The printer also uses an automated image matching algorithm to find the relative location of the key subject in each frame. In particular, the algorithms are divided into a crude computation step and a fine computation step which reduces computation time. The printer uses a criterion to check whether the actual key subject alignment is satisfactory. The optics for printing and key subject alignment are assembled on a single mechanical stage to reduce mechanical errors.

27 Claims, 15 Drawing Sheets

SINGLE-STAGE 3D PHOTOGRAPHIC PRINTER WITH A KEY-SUBJECT ALIGNMENT METHOD

BACKGROUND OF THE INVENTION

1. Field of the Invention

The present invention relates generally to an optical apparatus for producing three dimensional (3D) photographs, and more specifically to a 3D printer which projects a set of 2D images onto a lenticular-type material to form a composite 3D photograph.

2. Prior Art

In lenticular-type three dimensional (3D) photography, the basic process involves taking a plurality of two dimensional (2D) views from a number of horizontally-spaced vantage points, and compressing these 2D views onto each of the lenticules of a lenticular screen to form a 3D composite image of the scene. The lenticular screen is a sheet of transparent material with the front side embossed with an array of cylindrical lenses with the backside coated with a photosensitive layer or the lenses can be attached to photographic film or paper. The 2D views are captured by a camera which exposes a number of frames onto photographic film. The basic process of producing a lenticular-type 3D photograph from a set of 2D frames has been discussed in detail in a number of books and patent disclosures. For example, L. Dudley discussed in "Applied Optics and Optical Engineering" (R. Kingslake, Ed., 1965) a printing method where the lenticular screen is transported intermittently so that each of the eight 2D images recorded on film is exposed at different angles; T. Okoshi discussed in "Three-Dimensional Imaging Techniques" (1978) the use of several projectors to expose a plurality of 2D images onto the photographic emulsion; U.S. Pat. No. 3,482,913 (Glenn) discloses a method of using a number of projectors for composing 3D photographs; U.S. Pat. No. 3,895,867 (Lo et al.) discloses a technique of recording images on all of the film areas underlying the lenticules with intermittent exposure and shifting of the print material; U.S. Pat. No. 4,120,562 (Lo et al.) discloses a scanning means for exposing a number of 2D images at different projection angles; U.S. Pat. No. 4,101,210 (Lo et al.) discloses a method of filling the film area underlying the lenticules by using a plurality of projection lenses; N. A. Valyus discussed in "Stereoscopy" (Focal Press, 1966) the importance of having proper registration of an image to obtain the 3D effect; U.S. Pat. No. 4,903,069 (Lam) discloses an apparatus and method of putting a machine readable code on the negative film so that registration of images can be carried out automatically; U.S. Pat. No. 5,028,950 (Fritsch) discloses a dual-stage 3D printer in which the exposure of 2D images onto the print material is carried out in a printing station while the computation for image registration and color adjustment is carried out in a separate editing station.

When composing a 3D photograph, two basic procedures must be carried out to insure a good result: 1) the selection of the key subject on an image, and 2) the alignment of key subject in each view. U.S. Pat. No. 3,895,867 (Lo et al) discloses a method of printing in which each negative is visually examined to select an object which will become the center plane of the 3D picture. The selected object is known as the key subject. The key subject in the photographed scene on each of the 2D views must be accurately registered on the lenticular print material in order to produce an in-focus 3D image, which is one of the most important steps in producing lenticular-type 3D photographs. In the past, the alignment of key subject is done manually. As mentioned in U.S. Pat. No. 4,903,069 (Lam), the alignment is carried out during the printing process by an operator who uses cross-hairs to register the key subject on the print material while viewing through an optical device.

U.S. Pat. No. 5,028,950 (Fritsch) mentions the use of a CCD video camera (without a lens) to capture the key subject of the first 2D image and place the information in digital memory (frame grabber), to be electronically combined with the key subject of the second frame. The operator uses a controller to move the film to bring the key subject in the second frame into registration with the stored location of the first frame while using the combined image as a guide.

The aforementioned manual methods for aligning the key subject of each view is time-consuming and relies heavily on the operator's skill and performance. It is desirable to implement an image comparison scheme so that key subject in each view can be automatically aligned.

In the past, some pattern comparison or image matching schemes have been mentioned in a number of patents. U.S. Pat. No. 4,903,069 (Lam) mentions using an image recognition device when printing 2D views taken by a multi-lens camera without having special codes imprinted on the negative. As mentioned, a video camera is used to view the key subject image of the first 2D frame and the view is digitized and stored by an image grabber for reference. After the first 2D frame is exposed onto the print material, the second 2D frame is transported to the approximated location of the first 2D frame. The video camera then compares the key subject image of the second 2D frame with the information of the first 2D view captured by the image grabber. Subsequently, the second 2D view is then registered to the first 2D view by an XY positioning device.

U.S. Pat. No. 5,028,950 (Fritsch) discloses a dual-stage 3D printer in which frame-to-frame registration data are produced electronically using a sophisticated image-processing system. In the disclosed dual-stage 3D printer, a CCD video camera with a 480×512 pixel array is used to capture the image on the negative and present it to the operator for key subject designation. Within the same video image, an area of 28×28 pixels is used by an auto registration computer to do correlation search on an image of 55×95 pixels (or larger area if necessary) from other frames in order to find the key subject location.

U.S. Pat. No. 5,036,356 (Lo) mentioned a method for the automatic correlation of 2D views in composing high quality 3D photographs. In a camera preloaded with photographic film, it is possible to take the first set of 2D photographs on the film of a target at a predetermined distance. In the mentioned method, the target images are projected onto a single CCD array or a group of CCD sensor arrays placed at the image plane of the printer with each individual sensor of the CCD array precalibrated. A computer on the printer is programmed to recognize the location of the target images on the CCD array. With the location of each target image known, the position of the enlarging lens or the easel on which the print material rests or the 2D negative can be adjusted so that the multiple frame images can be aligned. Invariably, these disclosures use a video camera or one or more CCD arrays to digitize the 2D images, and a computer to find the location of the key subject or target image in each frame.

Mathematically, the relative locations of the key subject in each frame can be accurately computed. In practice, there are two major disadvantages: 1) it will takes a considerable amount of time to compute the relative locations of the key subject in all 2D frames, and 2) the key subject registration carried out by mechanical means is not always accurate. In particular, in the dual-stage printing method disclosed by U.S. Pat. No. 5,028,950 (Fritsch) where key subject comparison is carried out on one mechanical stage while the actual alignment of key subject is carried out on another mechanical stage, good alignment is not always insured. Furthermore, in the dual-stage design where a long slack loop assembly is used to allow time differences between editing and printing, there will be a sufficiently long time elapsed between a set of negatives to be edited and the same set of negatives to be exposed for printing. The heating by the lamphouse in the editing station and the humidity in the air can distort the film. Consequently, the relative locations of the key subject at the time of printing may not be the same as those at the time of editing. This distortion on the film could add to the error in the final key subject registration on the photograph.

Thus, it is desirable to compose the 3D photograph in a single-stage printer where the optics for key subject comparison and the optics for printing are assembled on the same mechanical stage, and the printing is carried out immediately after the key subject alignment is completed. Moreover, in the dual-stage printer design, one video camera is used for both taking the full frame image for key subject designation and for acquiring image data for key subject alignment, without changing the optics of the camera. Such approach produces unacceptable errors in key subject registration on the 3D photographs. Furthermore, when different lamphouses are used for editing and printing, color balancing becomes a much more complex task.

SUMMARY OF THE INVENTION

An object of this invention is to produce lenticular type 3D photographs of improved quality in a shorter time.

The printer, according to the present invention, uses an automated image comparison means to locate the key subject in each 2D frame for alignment. In particular, the computation of the relative locations of the key subject is divided into a crude computation step and a fine computation step. Such an approach can reduce by over 80% the computation time needed while achieving the same precision in key subject registration. Also, by using a check-and-confirm scheme, the printer ensures that the key subject alignment passes a satisfactory criterion. A further object of this invention is to improve the accuracy in key subject registration.

This object has been achieved by assembling the optics used for printing and the optics used for key subject alignment on one mechanical stage. Furthermore, the printing is executed immediately after the key subject alignment is completed.

Briefly described, this invention discloses a printer that uses two video cameras with different magnifications for editing the negative and for acquiring key subject images. One video camera is used for picture cropping, key subject selection, and color balancing information collection. The other camera is used solely for acquiring image data around the key subject in each frame for key subject alignment. The relative distances of the key subject between frames are computed in two separate steps. A crude step uses a small number of data points to search a large area to find the approximate location of the key subject. This is followed by a fine step which uses a much larger number of data points to search a much smaller area to find the exact location of the key subject.

One of the most important features of the printer of the present invention, is the use of two video cameras to view the negative. One color camera views a full frame of the negative and presents the image to the operator for picture cropping and key subject selection. The other camera which is a black and white camera, through a taking lens with a much longer focal length, views and acquires only an enlarged section of a small area surrounding the key subject. This image enlargement is essential for achieving an accurate key subject registration on the 3D photograph. A single camera with a lens attachment can also be used.

A further object of the present invention is to develop a printer that is capable of more accurate registration than has been achieved in the past.

Currently, most commercial video cameras have an imaging sensor format in the neighborhood of 500 pixels by 500 pixels. With cropping and other factors considered, the portion of image to be printed on the 3D photograph is covered by about 400 pixels along the width of the photograph. If the same video camera is used, without modifying the optics, to collect image data for key subject alignment, the error margin would be plus-or-minus one half pixel, regardless of the choice of computing method or algorithm. The lenticule resolution of a typical quality 3D print material is about 200 or more lines per inch. On a 4-inch wide 3D photograph, there are about 800 or more lenticules along the width of the picture. When 400 pixels of video image are mapped onto 800 or more lenticules of the photograph, we have two or more lenticules for each pixel. This means that when only one video camera is used for both taking a full view for key subject selection and acquiring data for key subject alignment, the error margin for key subject registration on the photograph will exceed one lenticule, even when the best optics and mechanical design are implemented on the printer. This error margin increases with the number of frames of 2D negative used for composing a 3D photograph. For example, if one uses four 2D frames to compose a 3D photograph, the cumulative error margin on the photograph exceeds three lenticules. This cumulated error margin is generally considered too large for a quality 3D print. If one wishes to reduce the error margin to plus-or-minus one quarter pixel, for example, one must enlarge the image by a factor of 4 when acquiring data for key subject alignment. In that case, a lens system must be used on the camera so that only 1/16 of the image, around the key subject area, will be seen by the video camera.

In the printing cycle for exposing each set of 2-D views, the color video camera is moved into proper position of the first 2-D frame. At this time the operator analyzes the image for color, picture cropping and key subject selection. Once the key subject of the first frame is located it is adjusted to be in the center of the video image. The black and white camera is then moved so that the first frame is in the direct view of the camera. This camera only sees an enlarged section of the first frame regarding the key subject and surrounding area.

The density value of each pixel within the key subject area is stored in the memory of the computer. This data will be used to find the X, Y coordinate locations of the key subject in all subsequent frames.

It follows that the negative is moved by an "adjusted frame distance" to a position where the key subject of the next frame is approximately in the direct view of the black and white camera. The computer determines the adjusted frame distance in which the key subject is approximately located. The computer does a search in this area to determine the location of the key subject image. The computer then does a key subject alignment computation based upon a general formula set forth later. A fine computation is then made based upon using every pixel in the area in which the black and white camera is focused.

The computer then does an additional computation to determine that the key subject in the two frames are in satisfactory alignment based upon using the equations set forth later. Once this is accomplished, all of the frames are printed onto the print material for this set. This printing cycle is repeated with each set of frames.

DETAILED DESCRIPTION OF THE PREFERRED EMBODIMENTS

Figure 1:
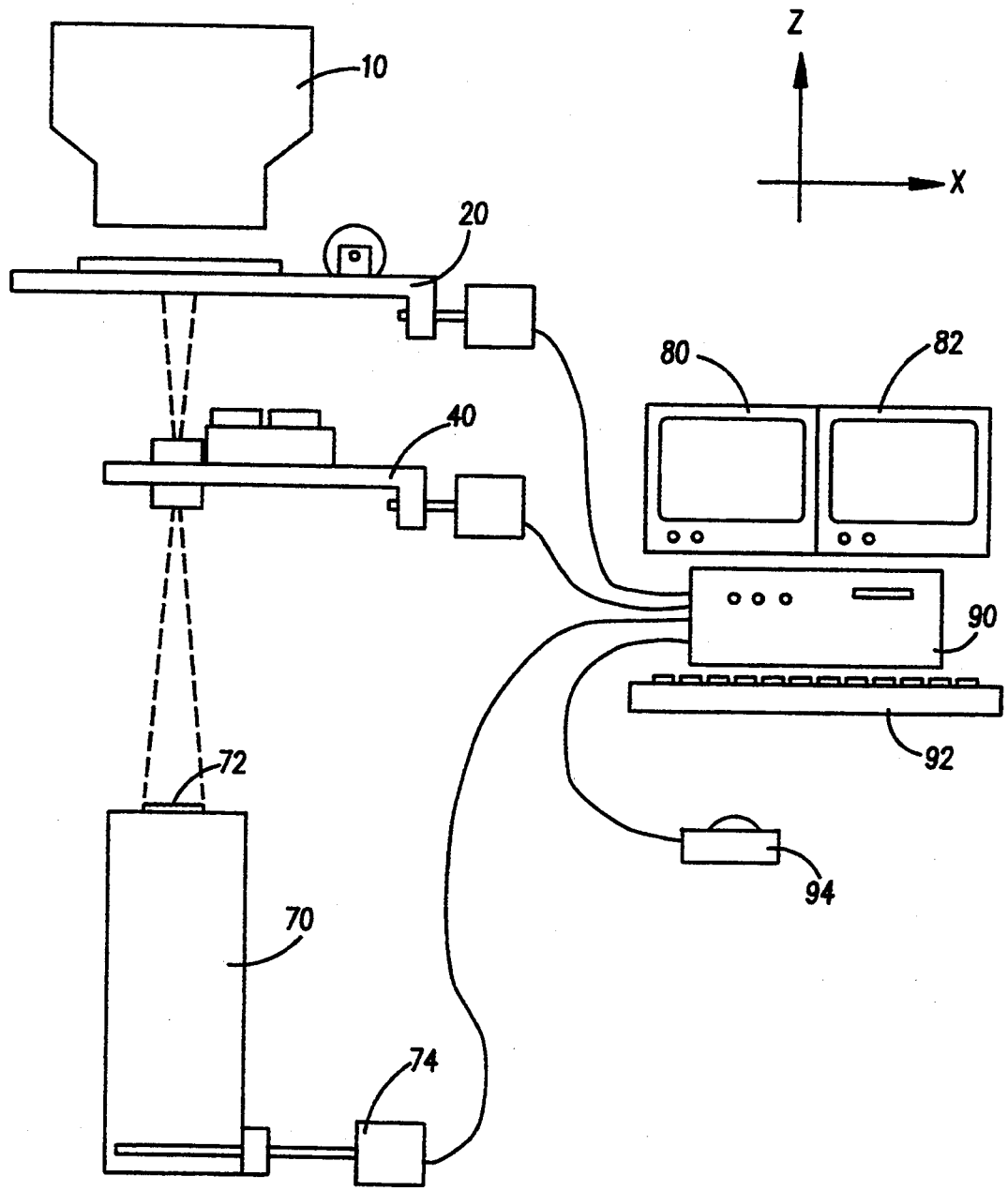
FIG. 1 shows the schematic representation of the single-stage 3D printer, according to the present invention.

FIG. 1 is a schematic presentation of a preferred embodiment of the single-stage 3D printer, according to the present invention. As shown in FIG. 1, the major components of the printer are a lamphouse 10, a negative carrier 20, an optical assembly 40, a print material cassette 70, a text monitor 80, a graphics monitor 82, a computer 90, a computer keyboard 92 and a trackball 94. The movement of the printer components is specified by the X, Y (not shown) and Z directions where the XY plane is parallel to the print material surface 72 on the print material cassette 70, and the Y direction at a 90° angle to the X direction. They Y direction is parallel to the optical axis of the lenticules on the print material in the lamphouse 10, three pairs of color filters in magenta, cyan and yellow are used to adjust the color content of the lamphouse output. These color filter pairs are driven by separate stepping motors. Numeral 70 denotes a print material cassette which houses a roll of print material. Numeral 72 denotes a section of the print material to be exposed for composing a 3-D photograph. The print material cassette 70, driven by a stepping motor 74, moves in the X direction during the printing process.

Numeral 20 denotes a negative carrier which is used to move a set of 2-D views on the negative film to various positions under the lamphouse 10.

Numeral 40 denotes an optical assembly which houses a projection lens and two video cameras.

Numeral 80 denotes a text monitor which gives instructions to the operator, reports printer status or lists other information. Numeral 82 denotes a graphics monitor for presenting an image to the operator. Numeral 90 represents a computer in which a frame grabber is installed to acquire images seen by the video cameras. Numeral 92 denotes a computer keyboard which is used for entering data or commands to the computer. Numeral 94 denotes a trackball which is used to move the negative carrier 20 around for cropping and to move the cross-hairs around for key subject selection. The click buttons on the trackball are used to communicate with the computer.

Figure 2:
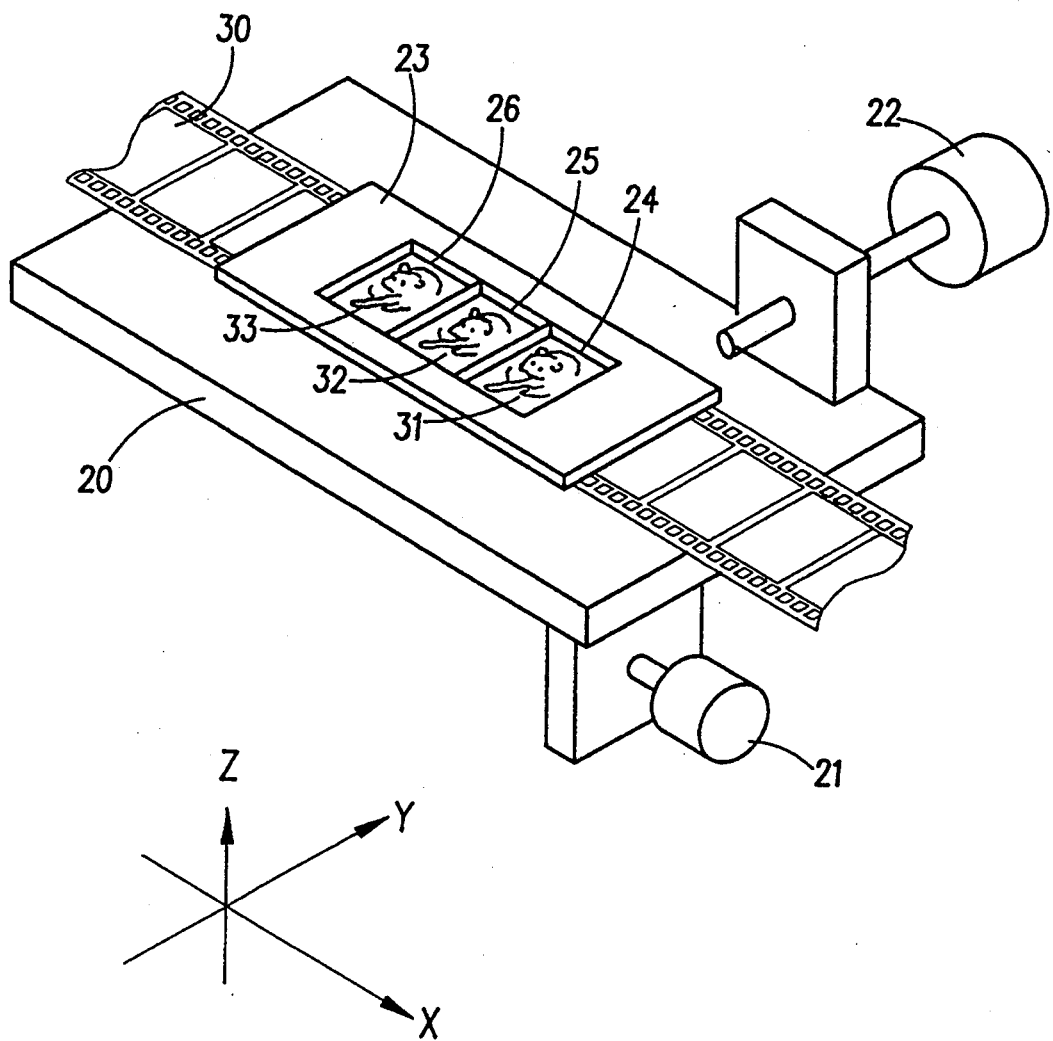
FIG. 2 is a schematic representation showing the major components on the negative carrier.

The details of the negative carrier 20 are shown in FIG. 2. The negative carrier has a negative mount 23 with a number of openings 24, 25, and 26 matching the frame format 31, 32, and 33, respectively, of the negative as shown in FIG. 2. The negative carrier, driven by stepping motors 21 and 22, can move in both the X and Y directions. Stepping motor 21 moves the negative carrier back and forth in the X direction and stepping motor 22 moves the negative carrier 20 back and forth in the Y direction.

As shown in FIG. 2, a film strip 30 is fed through and clamped down by a negative mount 23. A set of three 2D views on three frames 31, 32, and 33 on the negative are shown. As the printing cycle begins, this set of 2D views on the negative film is transported into the negative carrier 20 so that the three frames 31, 32 and 33 of the 2D negative line up with the three openings 24, 25 and 26, respectively, on the negative mount 23. It is understood that a certain film feeding mechanism is necessary for engaging the film onto the negative carrier but it is not shown here.

Figure 3:
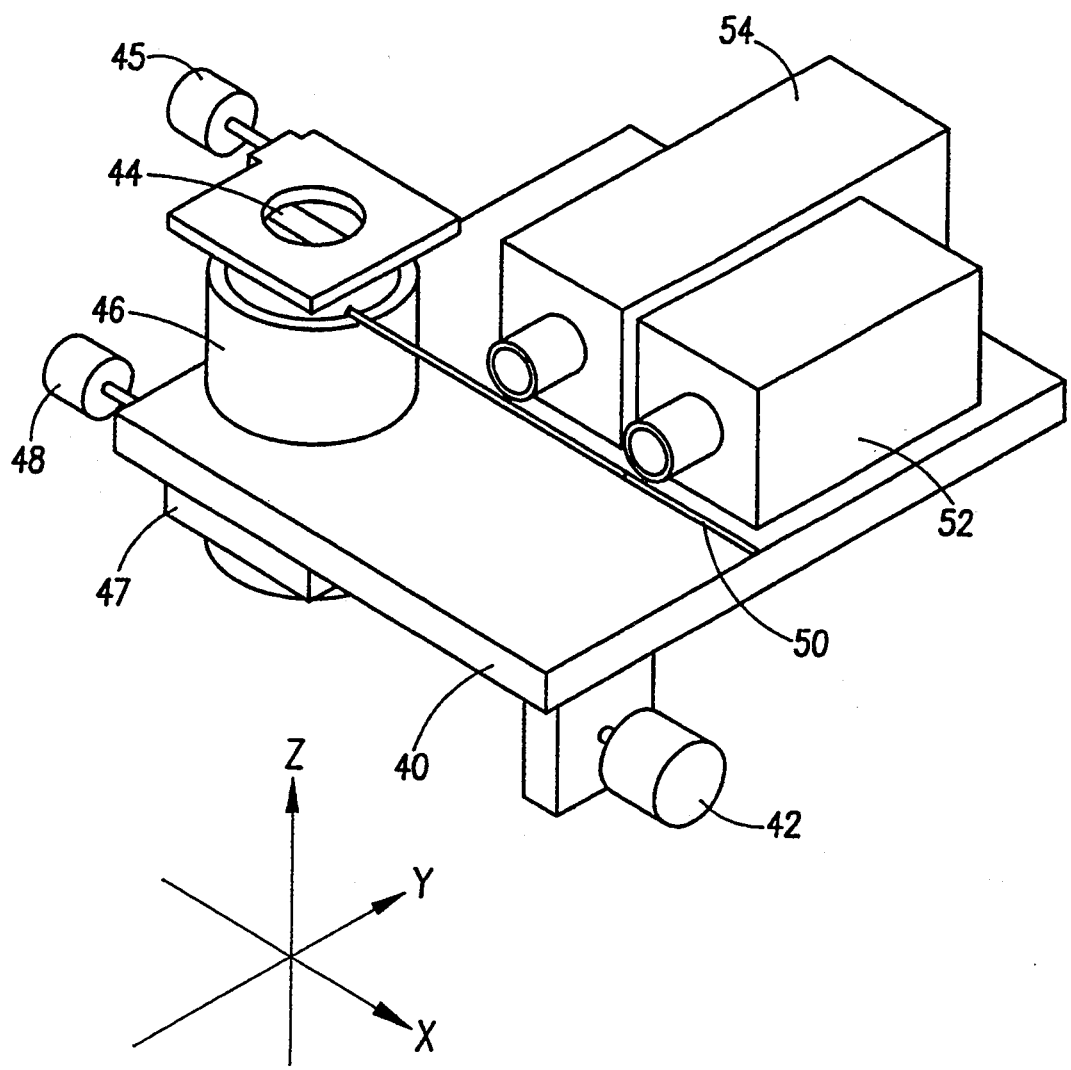
FIG. 3 is a schematic representation showing the major components on the optical assembly.

FIG. 3 shows the details of the optical assembly 40. The assembly, driven by a stepping motor 42, moves only in the X direction. The major components on the optical assembly are: an adjustable aperture 44 which is controlled by a stepping motor 45; a projection lens 46; a shutter 47, which is controlled by a stepping motor 48, is used to control exposure time in accordance with the density of the negative; a color video camera 54; a black and white video camera 52 and a plane mirror (preferably a first-surface mirror) 50 which folds the optical path of the video cameras so that the cameras view the negative at a right angle. Plane mirror 50 is at approximately 45° angle to the axis of the lens of the video camera. It is understood that camera 52 can be a color video or electronics camera and that both video cameras can use CCD array detectors or other detectors such as vidicon tubes. It is also understood that all stepping motors are directly or indirectly controlled by the computer. The color camera 54 is used for presenting a full-frame image to the operator for picture cropping, key subject selection and color analysis. The other camera 52 may be a black and white camera which is used to capture an enlarged section of the key subject and the image immediately surrounding the key subject.

Figure 4:
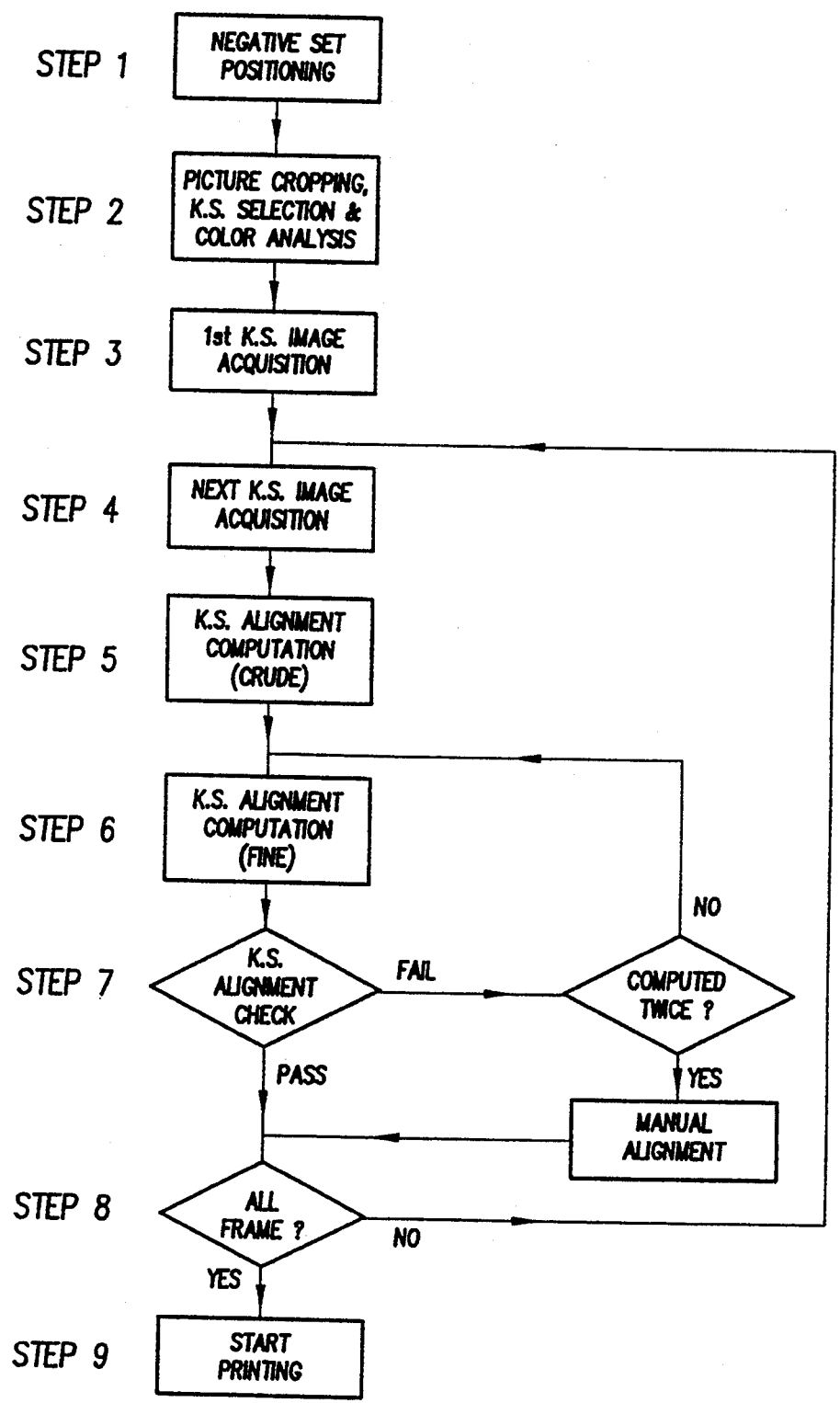
FIG. 4 is a flow-chart showing the procedure in a printing cycle.

FIG. 4 is a block diagram showing a series of steps taken in a printing cycle.

These steps present the detailed procedure in the printing cycle for exposing each set of 2-D views as follows:

Step 1: A set of negatives is engaged in the negative mount 23 so that the negative frames 31, 32, and 33 line up vertically with the negative mount openings 24, 25, and 26 respectfully, as shown in FIG. 2.

Figure 5:
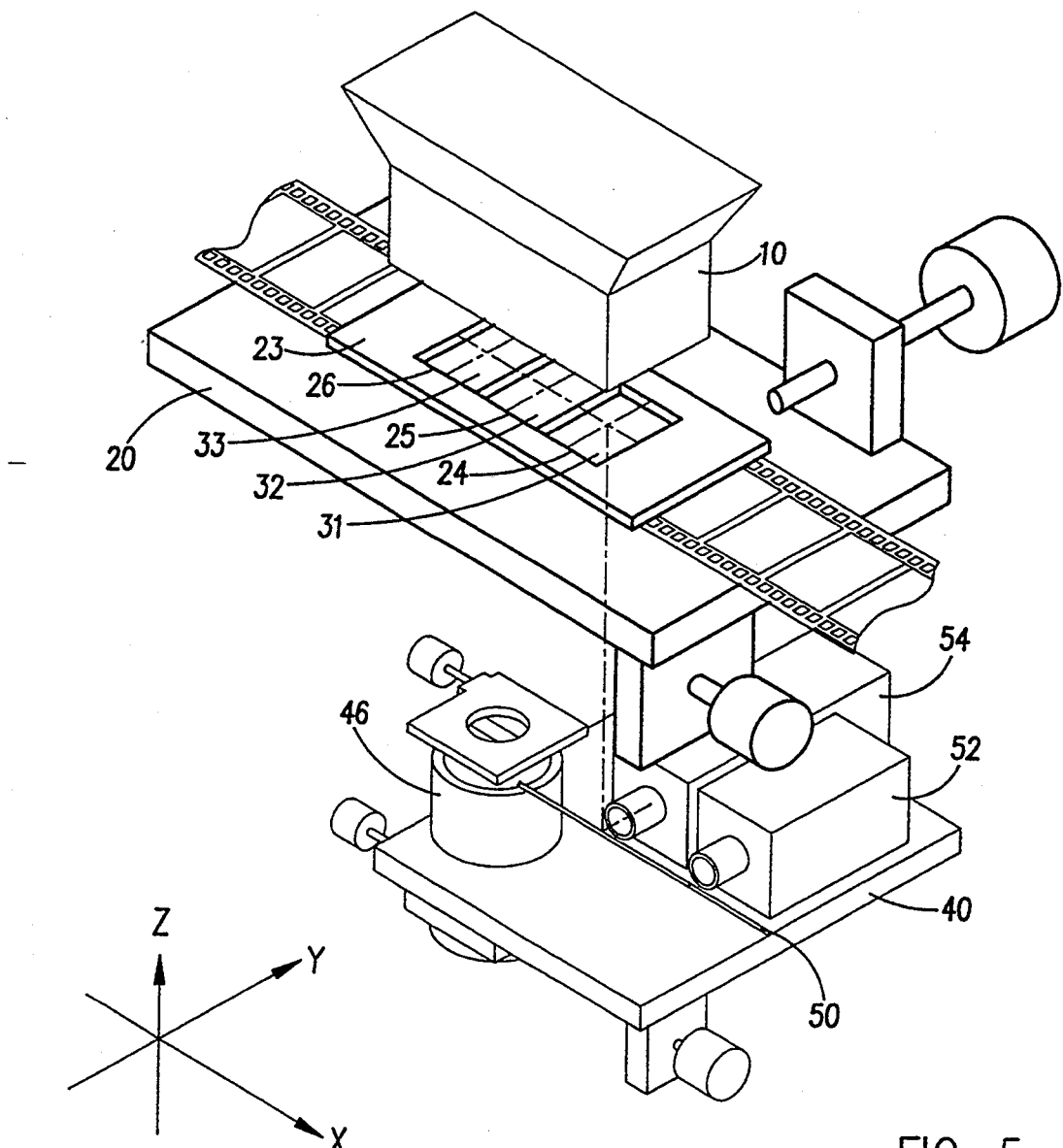
FIG. 5 shows the position of the negative carrier and that of the optical assembly in relation to the lamphouse when the color video camera is used to view a full image of the negative for key subject selection and picture cropping.

Step 2: The optical assembly 40 moves to a position where the color video camera 54 is in direct view of the first 2D frame 31, as shown in FIG. 5. While the entire or a part of the image is digitized and channeled to the computer for color analysis, the image is presented on the monitor 82 to the operator for picture cropping as described in connection with FIG. 6 and key subject (K.S.) selection as described in connection with FIG. 7. After the operator has selected the key subject, the negative carrier is driven by the stepping motor so that the key subject of the first frame is located in the center of the video image.

Figure 8:
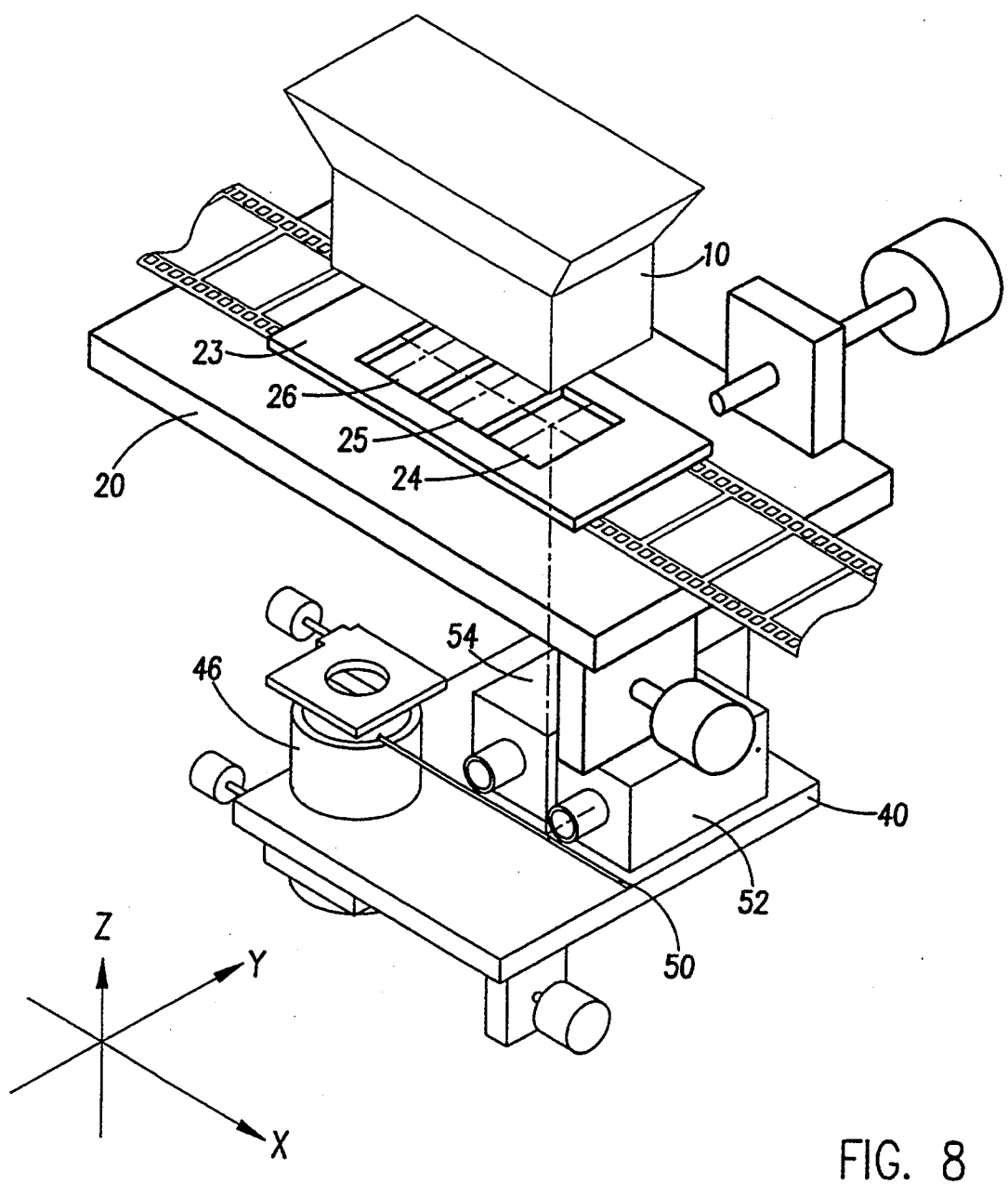
FIG. 8 shows the position of the negative carrier and that of the optical assembly in relation to the lamphouse when the black and white (B/W) video camera is moved to view an enlarged section around the key object area of the first 2D frame and acquire the image of the same.

Step 3: The optical assembly 40 is moved to the position where the key subject in the first frame 31 is in the direct view of the black and white camera 52, as depicted in FIG. 8. Through a longer focal-length lens, the black and white camera only sees an enlarged section of first frame 31 showing the key subject and immediately surrounding area. This first key subject is acquired and stored in the frame grabber. This will be used to find the X, Y coordinate location of this key subject in all of the other frames.

Figure 9:
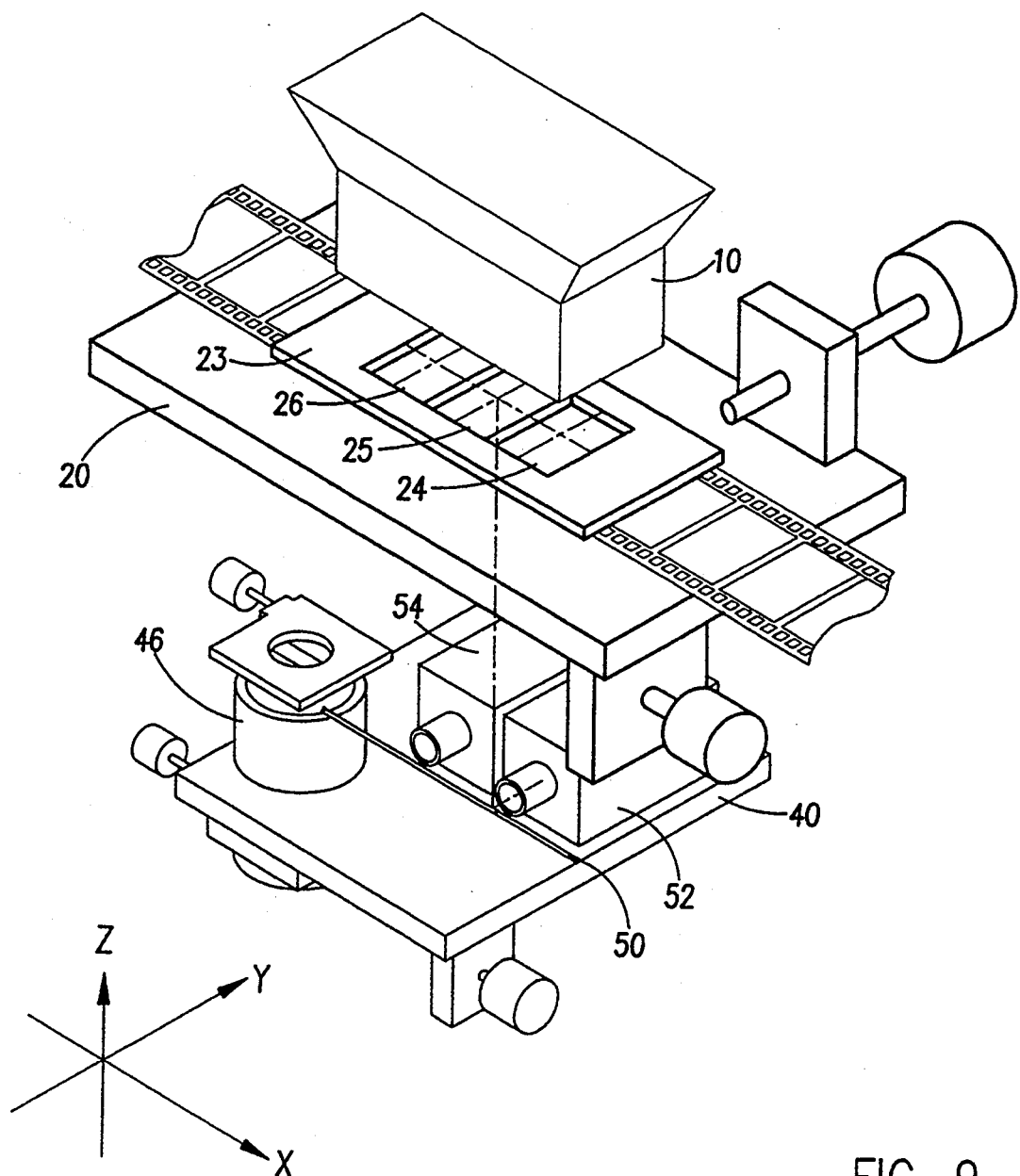
FIG. 9 shows the position of the negative carrier and that of the optical assembly in relation to the lamphouse when the B/W video camera is used to view an enlarged section around the key subject area of the second 2D frame and acquire the image of the same.

Step 4: The computer then directs the optical assembly 40 to move by "an adjusted frame distance" to a position where the key subject of the next frame 32 is approximately centered in the view of the black and white camera, as shown in FIG. 9. The computer determines the "adjusted frame distance", D by the following formula.

$$D = d(1 + f/K)$$

where d is defined as the center-to-center distance between adjacent frames of the 2D negative, and f is the focal length of the 3D camera lenses. In the equation, K is a distance of the key subject from the camera and is assumed in this case to be 7 ft. The black and white camera 52 acquires an enlarged section of the key subject area of the current frame.

Step 5: This step involves the key subject image crude alignment computation. Based on the first key subject image data acquired in Step 3 and the key subject image data acquired in Step 4, the computer computes the actual distance of the key subject between negative frames for key subject alignment. The key-subject alignment computation is based on a general formula given by Equation 2.

$$S(a,b) = \sum_i^n \sum_j^m [P(i,j) - Q(i+a, j+b)]^2$$

In Equation 2, P(i,j) is the intensity of the pixel (i,j) of the P array which is a n×m array of the key subject image and surrounding area of the first frame acquired in Step 3; Q(i,j) is the intensity of the pixel (i,j) of a Q array which is a N×M array of the key subject image and surrounding area acquired in Step 4, with N>n and M>m. S is a correlation coefficient which indicates the matching between the P and Q arrays such that a represents the number of pixels of movement necessary in the X direction and b represents the number of pixels of movement necessary in the Y direction. The purpose of this computation is to seek the minimum value of S, indicating the key subject on the P array being aligned with the key subject on the Q array. In this crude computation step, N and M are usually taken to be equal to or greater than 2n and 2m, respectively. In general, the computation in Step 5 does not use all pixels in the n×m or N×M images. For example, one can use every second or third i, j, a and b to compute S(a,b) in order to reduce the computation time. For example, if n=m=32, N=M=64 and i, j, a, b are either odd or even numbers, then there will be 65,536 (=16×16×16×16) computations for the square terms in Equation 2. But if every i, j, a and b are used, the number of square term computations will be 1,048,576 (=32×32×32×32=16×65,536).

Step 6. This step involves the key subject image fine alignment computation. Let (A,B) be the value of (a,b) where S(a,b) is a minimum according to Equation 2, then the general formula for the fine computation is given by Equation 3:

$$S(a,b) = \sum_i^u \sum_j^v [P(i,j) - Q(i+a, j+b)]^2$$

with $$1 \leq u, \ 1 \leq j \leq v, \ 0 \leq a \leq (U-u), \ 0 \leq b \leq (V-v)$$

In the equation, u×v is the dimension of first key subject image (P array) acquired in step 3 and U×V is the dimension of the key subject image (Q array) acquired in Step 4, but centered at

[(N−n−2A)/2,(M−m−2B)/2]. Unlike the crude computation, the fine computation uses every pixel in the array. Because the key subject on the Q array is now at the proximity of that of the P array, we can use a much smaller Q array for computation. For example, if we choose u=v=32, U=V=40 and use every i, j, a and b, then the number of square term computations, according to Equation 3, is 65,536 (=32×32×8×8). Thus, the total square term computations for both crude and fine alignment in this two-step process is 2×65,536, a much smaller number than 16×65,536 had we used a one-step process to achieve the same precision in key subject registration.

Step 7: In this step the computer checks the key subject image alignment to make sure that it is correct. From the results obtained in Step 5 and Step 6, the negative carrier 20 adjusts its position so that the key subject images in the two frames are assumed to be in perfect alignment. More specifically, if (G,H) is the value of (a,b) where S (a,b) is a minimum according to Equation 3, then the negative carrier 20 moves in the X direction by a distance equivalent to G pixels, and in Y direction by a distance equivalent to H pixels as seen by the B/W camera. To insure that the computations in Step 6 are accurate and that the mechanical translation by the negative carrier is precise, the computer 30 is programmed to check the alignment results. The computer 30 compares the two key subject images according to Equation 4 or Equation 5:

$$D = (1/wW) \sum_i^w \sum_j^W abs[P(i,j) - Q(i,j)]$$

$$D = (1/wW) \sum_i^w \sum_j^W [P(i,j) - Q(i,j)]^2$$

with $$i=1,w; j=1,W$$

In Equation 4, abs[x] means the absolute value of x and (1/wW) is a normalization factor. Similar to Equation 2, P(i,j) and Q(i,j) are pixel intensity of key subject image arrays. Because of the various sources of noise in the video images, D usually does not reduce to zero even if we have a perfect key subject alignment. Therefore, we set a satisfactory criterion by assigning a threshold value E such that the alignment result is acceptable only when D is smaller or equal to E. Otherwise the fine alignment computation is repeated.

Step 7a: This step checks whether the computation for the same frame has been done twice. If the answer is no, then the loop goes back to Step 6 and repeats Step 6. If the answer is yes, then operator assistance is summoned and the next step will be Step 7b.

Step 7b: The B/W video images of the first frame 31 and the current frame is electronically combined and presented on the graphic monitor. The operator uses the trackball to move the negative carrier 20 to manually align the key subject while using the combined video image as a guide. When the manual alignment is done, the procedure proceeds to Step 8. It should be noted that manual alignment of step 7b is needed only when the negative is extremely over-exposed or under-exposed.

Step 8: This step checks whether the key subject alignment for all frames has been accomplished. If the answer is no, the loop goes back to step 4. If the answer is yes, then the exposure of the print material begins.

Step 9: The negative carrier and the optical assembly move to the exposure positions shown in FIG. 11 to FIG. 13. When the printing of a set of 2D negative is done, the printing cycle goes back to Step 1 until all sets are printed.

Figure 6:
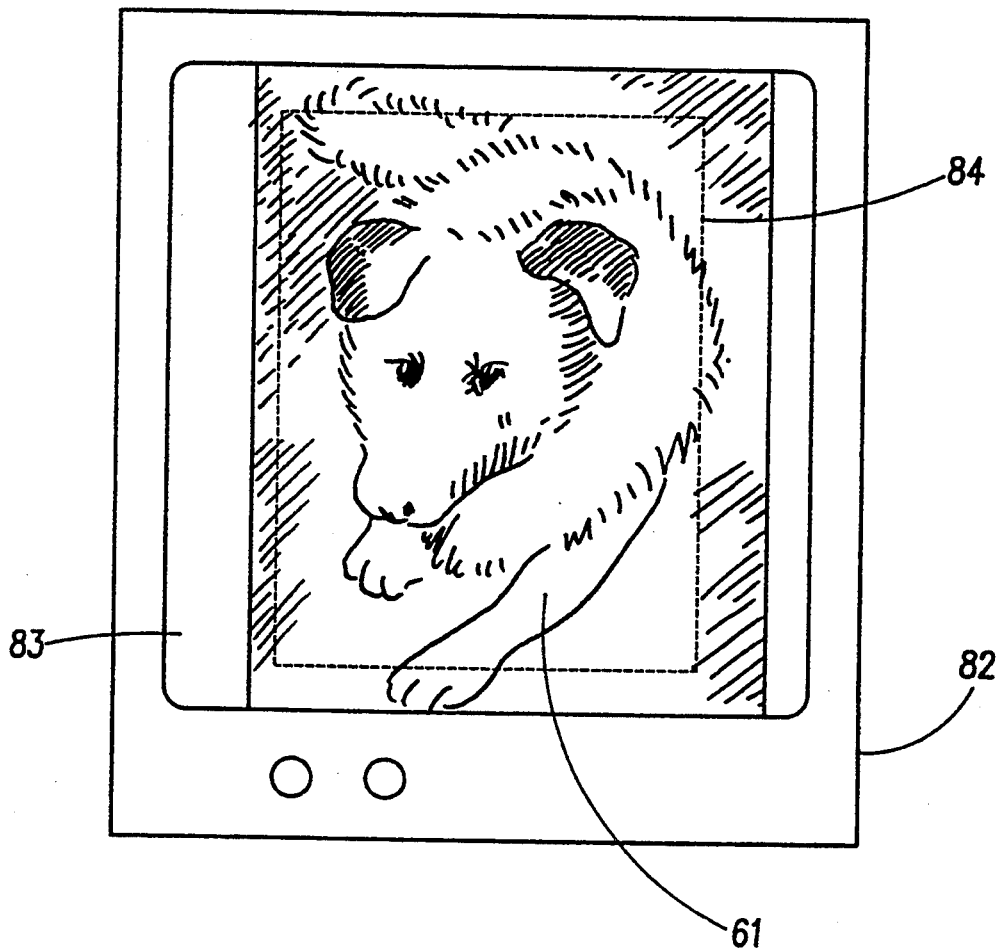
FIG. 6 shows the full image of the first frame as presented to the operator on the graphics monitor. A rectangular graphic frame on the monitor screen defines the cropped area.

FIG. 5 shows the negative carrier 20 being positioned directly under the lamphouse 10 and the optical assembly 40 being moved to a position such that the color video camera 54 is in direct view of the first frame of the negative, positioned at the opening 24 of the negative carrier 20. While a part or the entire frame of the video image is acquired and channeled to the computer for color and density analysis, the video image of the full frame is presented to the operator on the graphics monitor 82, as shown in FIG. 6. The image presented on the monitor is preferably converted to a positive image. The graphics monitor 82 can be a color monitor or a black and white monitor. If it is a color graphic monitor 82, it can also be used for manual color balancing and density adjustment.

In FIG. 6, numeral 82 denotes the graphics monitor whose screen is denoted by numeral 83. The image 61 shown on the screen represents a full image of first frame 31 (FIG. 2) of a set of 2D views as seen by the video camera 54. Numeral 84 denotes a rectangular graphic frame drawn on the monitor screen, defining an image area to be printed on photograph. The operator can use the trackball 94 to move the negative carrier 20 to select the cropping area. The operator pushes the trackball click button to acknowledge the completion of picture cropping.

Figure 7:
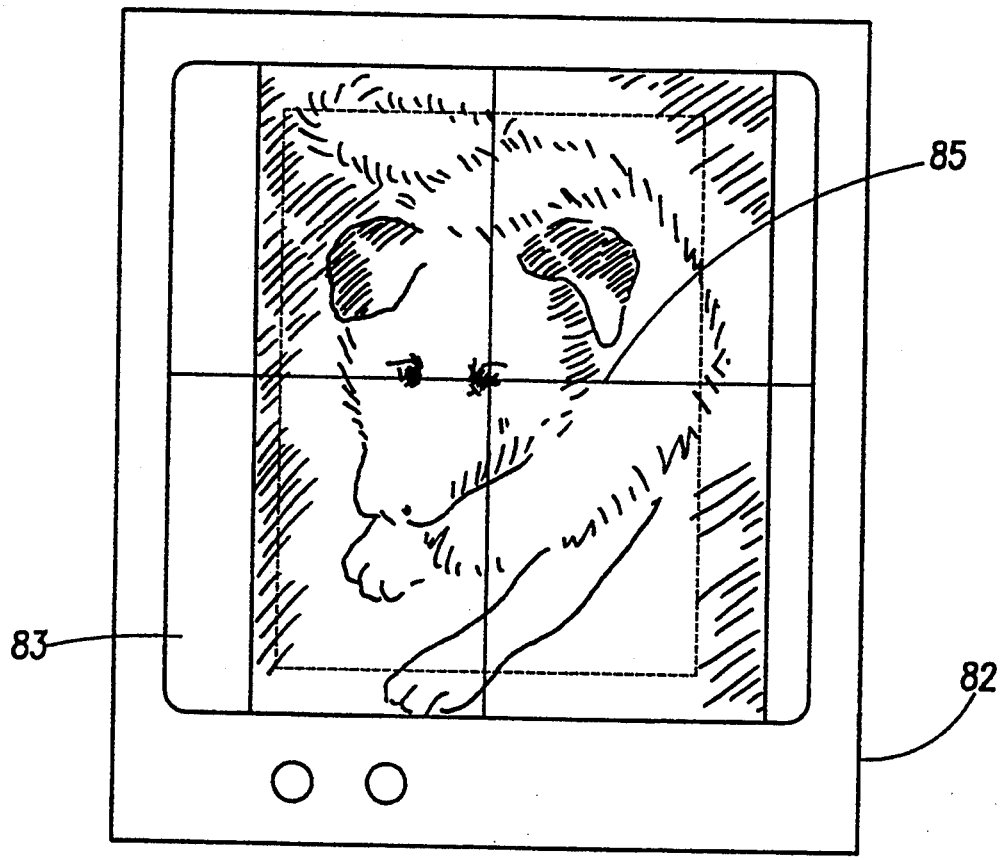
FIG. 7 shows a pair of cross-hairs superimposed on the displayed image of FIG. 6. These cross-hairs can be moved around to select a key subject.

After the cropping is accomplished, a pair of cross-hairs is drawn on the monitor screen for key subject selection. In FIG. 7, cross-hairs 85 can be moved around with the trackball 94 to any position on the screen to select the key subject. The operator can push the trackball click button to acknowledge the completion of key subject selection.

It follows that the negative carrier 20 moves in both X and Y directions so that the selected key subject appears in the center of the video image. Stepping motor 21 moves the negative carrier 20 in X the direction and stepping motor 22 moves it in the Y direction. The optical assembly 40 moves to a new location such that the black and white camera 52 is in direct view of first frame, as shown in FIG. 8. At the same time, the enlarged section of the first frame image surrounding the key subject is acquired by and stored in the frame grabber.

As shown in FIG. 9, the optical assembly 40 stops at a new position such that the black and white video camera is in the direct view of the key subject area of the second frame. After the key subject area of the second frame is acquired by the frame grabber, the computer computes the key subject distance between first and second frames.

Figure 10:
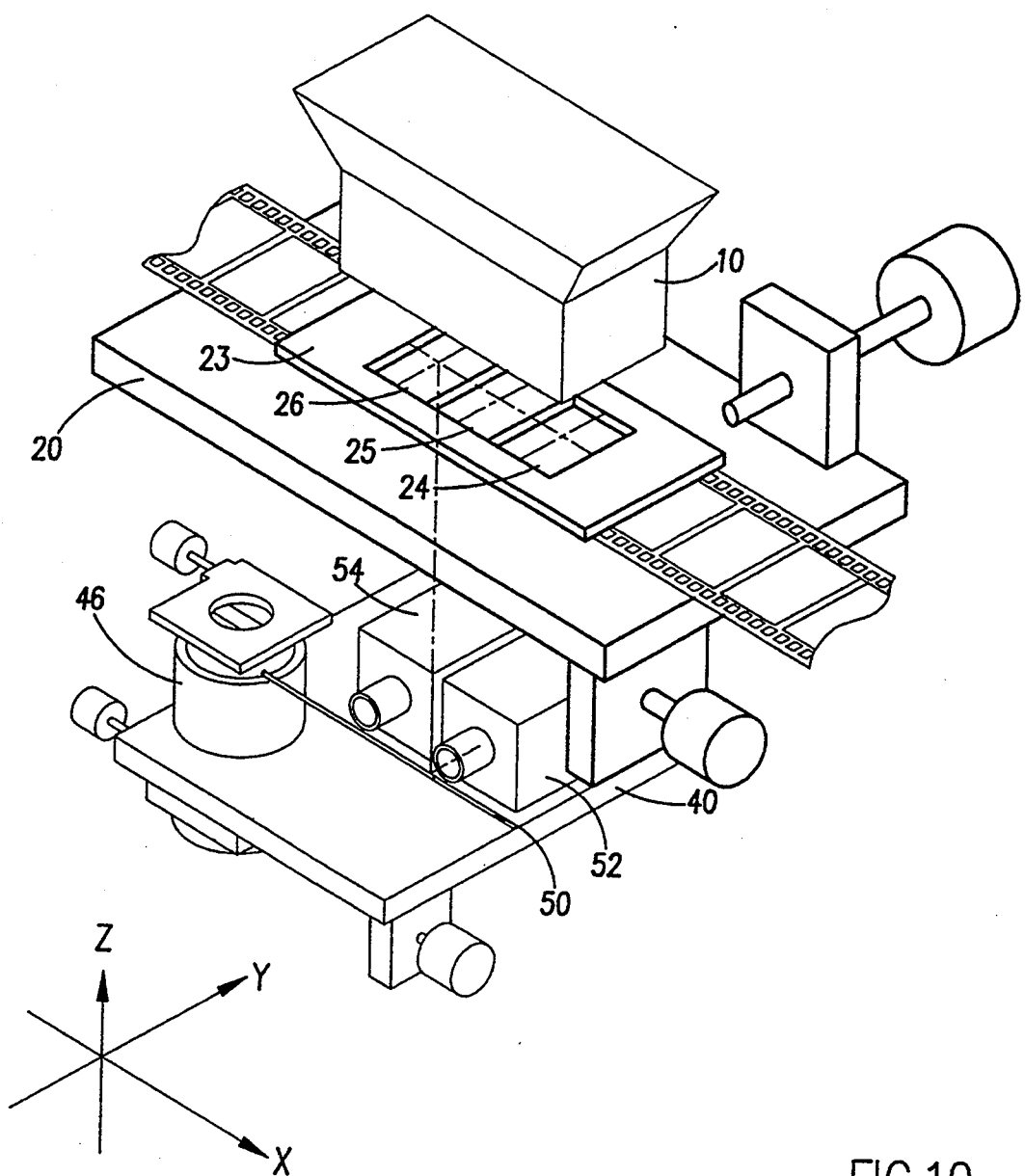
FIG. 10 shows the position of the negative carrier and that of the optical assembly in relation to the lamphouse when the B/W video camera is used to view the key subject of the third 2D frame.

When the key subject alignment for the first and second frames is completed, the optical assembly moves to another position so that the key subject area of the third frame is in direct view of the black and white camera, as shown in FIG. 10. After the key subject area of the third frame is acquired by the frame grabber, the computer computes the key subject distance between first and third frames.

Figure 11:
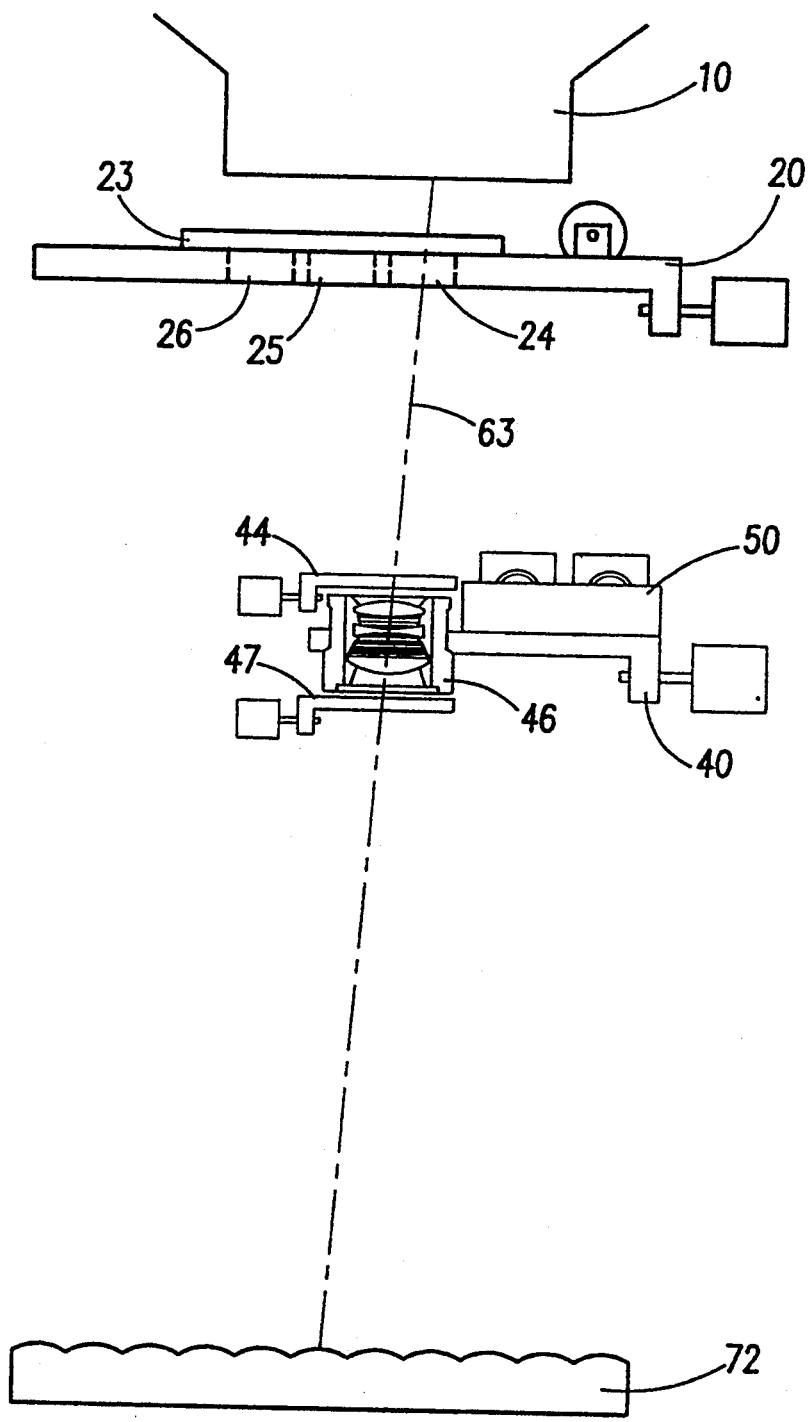
FIG. 11 shows the position of the negative carrier and that of the optical assembly in relation to the lamphouse when the exposure of the first 2D frame is in progress.

When the key subject alignment for the second and third frames is completed, the exposure process begins. As shown in FIG. 11, the negative carrier 20 and the optical assembly 40 move to the starting position such that the first frame image is projected through the projection lens 46 onto the print material 72. It is understood that the shutter 47 and the aperture 44 are operated as required. In FIG. 11, the dotted line 63 represents the projection angle in exposing the first frame onto the print material 72.

Figure 12:
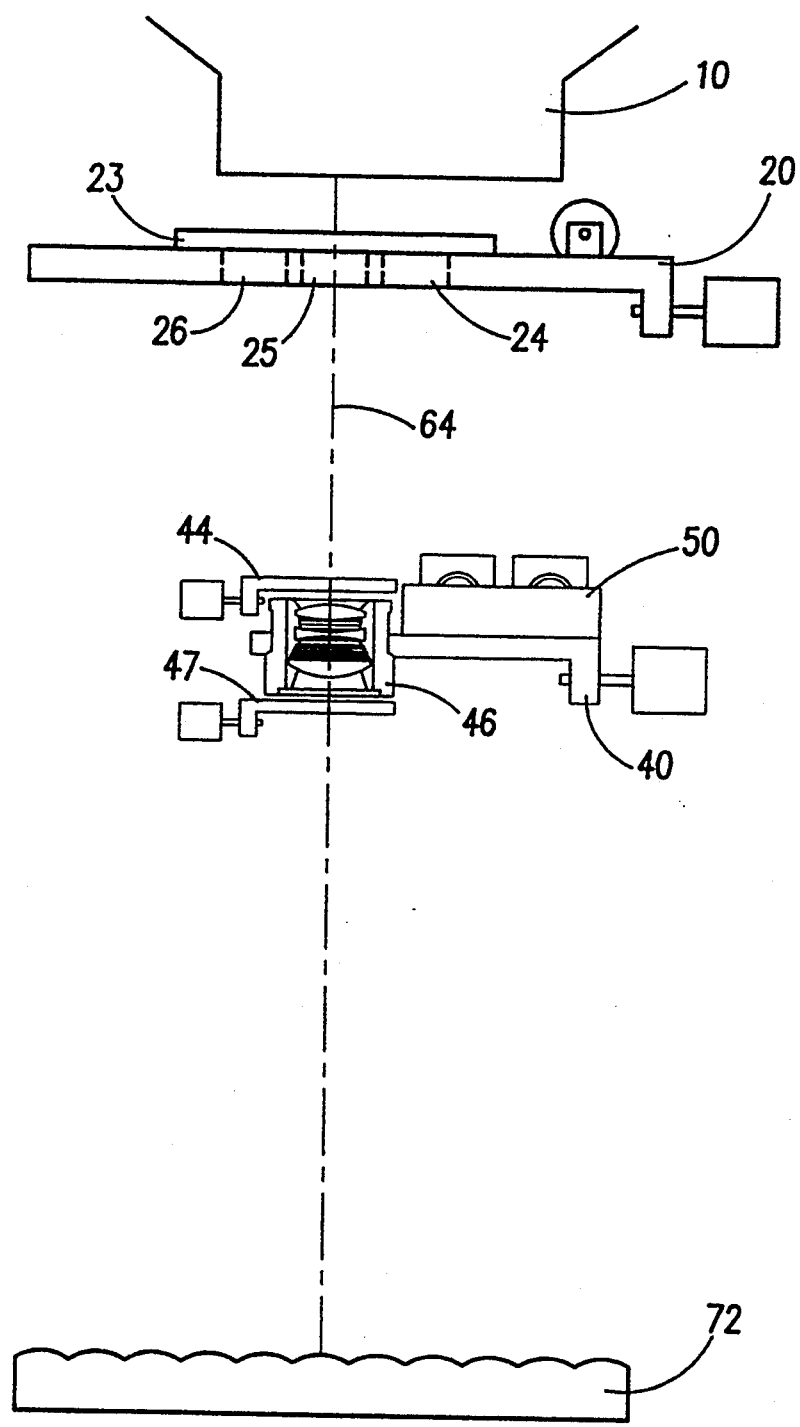
FIG. 12 shows the position of the negative carrier and that of the optical assembly in relation to the lamphouse when the exposure of the second 2D frame is in progress.

When the exposure of the first frame is completed, the negative carrier and the optical assembly move to the second position to expose the second frame, as shown in FIG. 12. The dotted line 64 represents the projection angle in exposing the second frame onto the print material 72.

Figure 13:
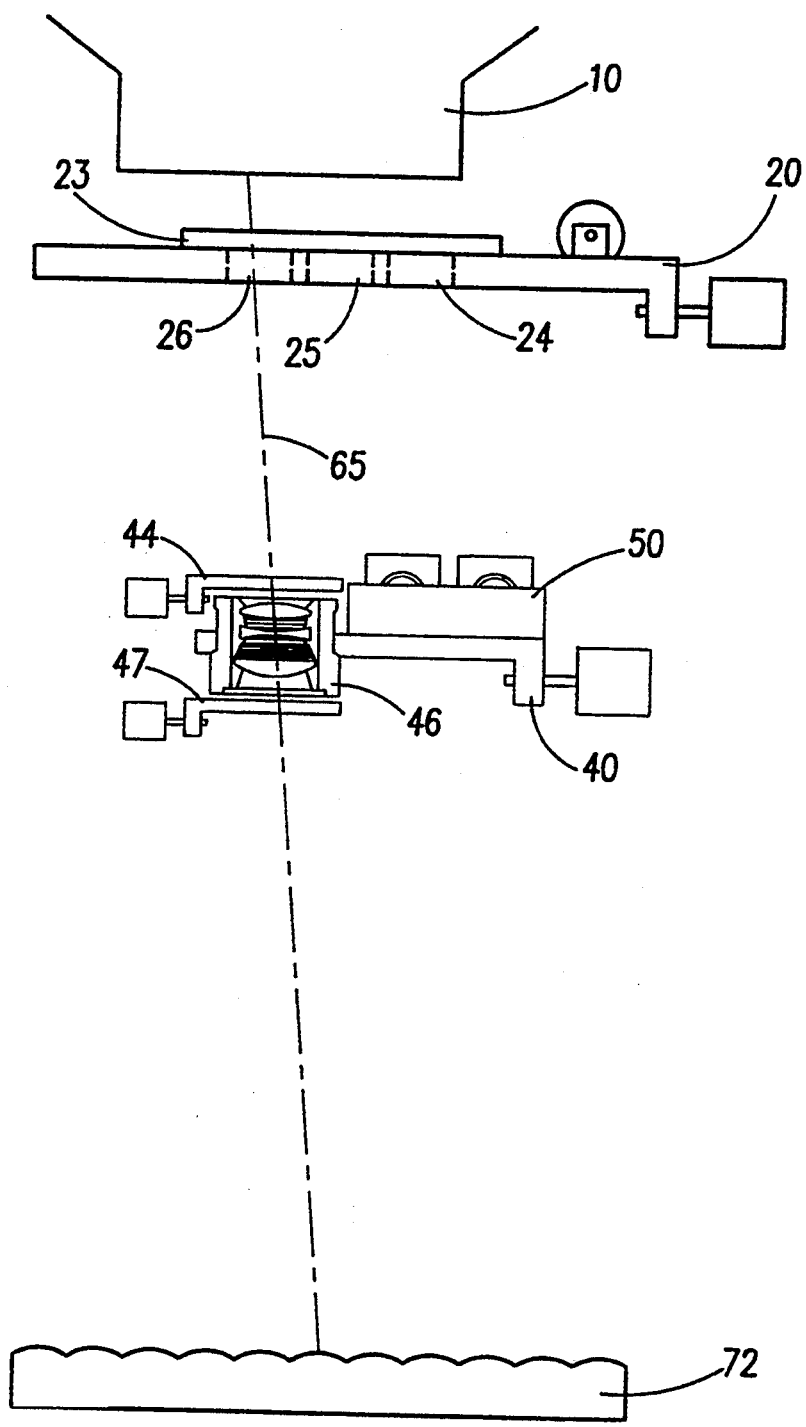
FIG. 13 shows the position of the negative carrier and that of the optical assembly in relation to the lamphouse when the exposure of the third 2D frame is in progress.

Similarly, the negative and the optical assembly 40 move to the third position to expose the third frame, as shown in FIG. 13. The dotted line 65 represents the projection angle in exposing the third frame onto the print material. It is understood that the location of the negative carrier 20 in the second and third position takes into account the key subject alignment so that key subjects in all 2D views are accurately registered on the 3D photograph.

Figure 14A:
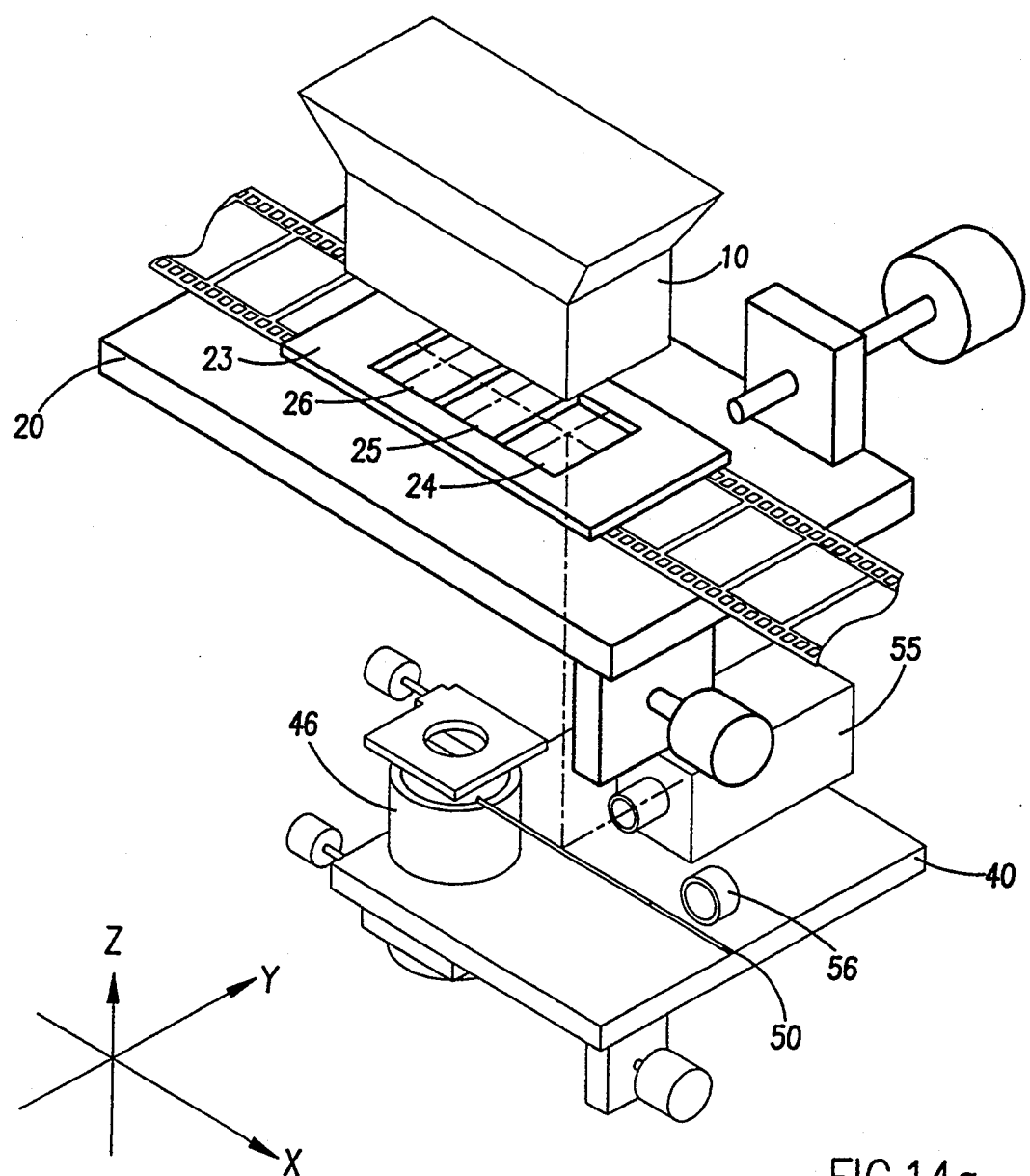
FIG. 14a shows another embodiment of the printer in which a single video camera is used with a lens attachment which replaces the other video camera.
Figure 14B:
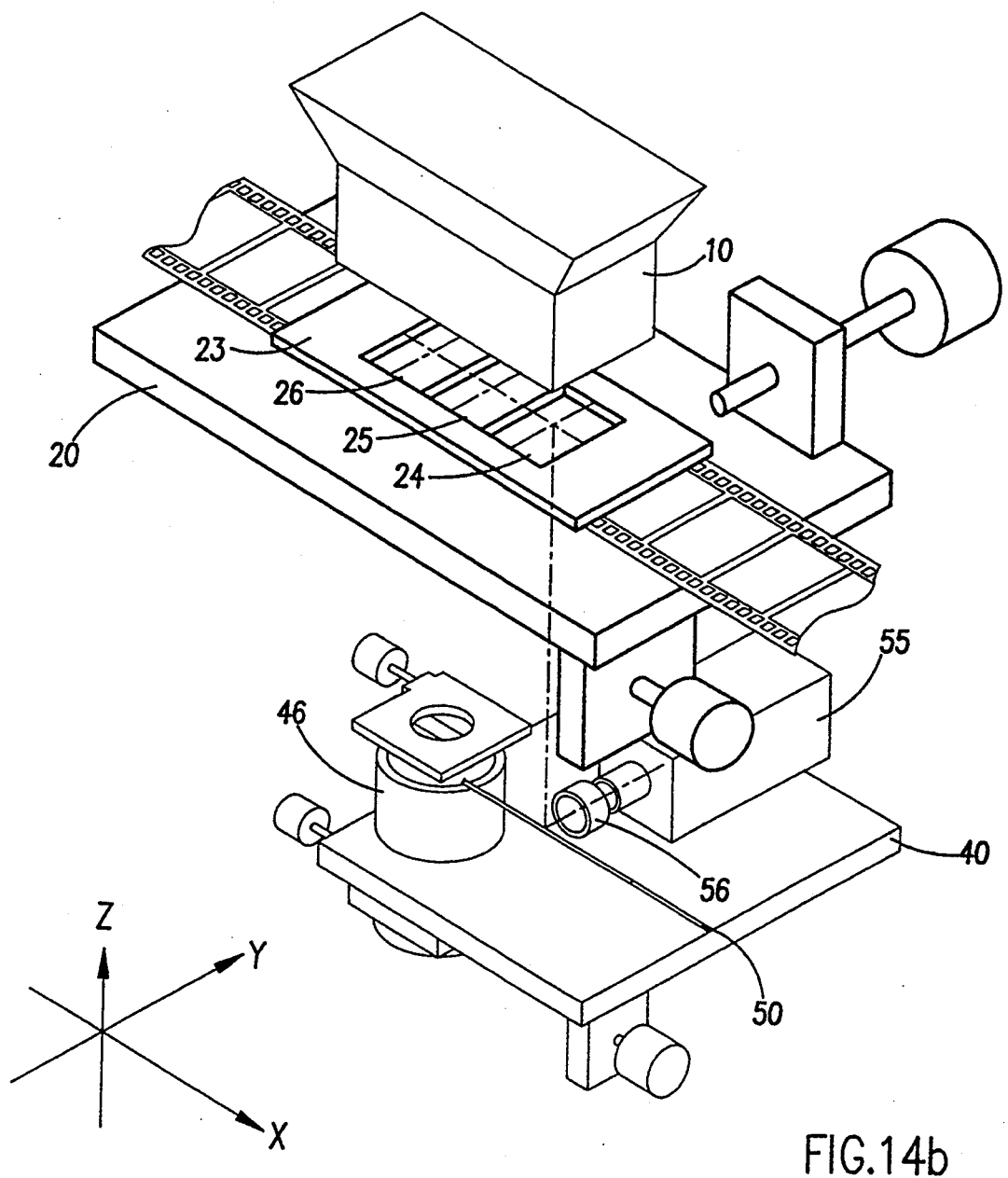
FIG. 14b shows the printer of FIG. 14a with the lens attachment in position on the video camera.

The use of two video cameras—one for picture cropping, key subject selection and color analysis; and one for key subject alignment—can be accomplished by using only one video camera with a lens attachment to change the effective focal length of the camera, or one video camera with two lenses with different focal lengths. As shown in FIG. 14a, a color video camera 55 is used for taking a full frame image of the first 2D negative for picture cropping, key subject selection and color analysis, similar to FIG. 5. But when a lens attachment 56 is placed in the optical axis of the video camera, as shown in FIG. 14b, the video camera sees only an enlarged section of the image. In effect, the function of the video camera 55 in conjunction with the lens attachment 56 is equivalent to the B/W video camera 52 shown in FIG. 8.

While the printing steps are described with the optical assembly 40, or platform, being moved in Steps 2, 3, 4, and 7 into proper position, it should be realized that either the negative carrier 20 or print material cassette 70 could be moved instead to obtain the proper position or alignment. Similarly, step 7b describes moving the negative carrier 20 and Step 9 describes moving the optical assembly 40. It is the relative movement between the negative carrier 20, print material cassette 70 and optical assembly 40 that is necessary to obtain proper alignment. Thus, it can be achieved by moving any of these assemblies or platforms into proper position.

Improved accuracy in key subject registration achieved by this invention has resulted in part from placing the optical assembly 40, which includes the color video 54 and B/W 52 video cameras and projection lens 46 on the same platform or mechanical stage. This allows the key subject alignment and printing to be done in one stage. The key subject registration in the past has not always been accurate when carried out in two stages. Two stage printing usually requires a long slack loop assembly of the film where the ambient conditions may distort the film. The single stage editing and printing of this invention is preferably carried out on a single platform or assembly. Two platforms, with one for the cameras and another for the projection lens, could be used if they were locked in position to one another and the length of the film was minimized.

The video cameras 52 and 54 view the negative 24 at a 90° angle as shown in FIG. 5. through the use of a plane mirror 50. While this is the preferred embodiment, it is possible to arrange the optical assembly 40 so that they view the negative head-on. This of course, increases the vertical height of the printer.

While the present invention has been described with reference to the preferred embodiment, it shall be understood by those skilled in the art that various changes may be made and equivalents may be substituted for elements thereof without departing from the scope of the invention.

Therefore, it is intended that the present invention shall include embodiments falling within the scope of the appended claims.

What is claimed is:

1. In a printer for printing an image array on the photosensitive surface of lenticular print film from a set of 2-D views with a key subject image on each 2-D view, said printer having a negative carrier, and a projection lens mounted on a platform for printing said 2-D views onto lenticular print film, and means for moving said platform relative to said negative carrier and lenticular print film, an improvement comprising:
    (a) a printer being arranged as a single stage printer and having first optical means for editing the 2-D views and second optical means for locating the key subject image on each 2-D view, said first optical means for editing and second optical means for locating each being placed on said platform, and means for conveying the location of the key subject image to a computer which computes the actual location of the key subject image and controls the relative movement of the platform for correct alignment of the key subject image in each 2-D view in a set for printing.

2. The improvement of claim 1 in which the editing means is a color video camera.

3. The improvement of claim 2 in which the locating means is a video camera.

4. The improvement of claim 3 in which a mirror is used so that the video camera views the 2-D views in the negative substantially at a right angle to the negative.

5. The improvement of claim 3 in which the video cameras use CCD detector arrays as the image sensor.

6. The printer of claim 3 in which the video cameras use vidicon tubes as the image sensor.

7. The improvement of claim 1 in which the locating means is a video camera.

8. The improvement of claim 7 in which the video camera is located so it only views an enlarged section of the key subject area of each 2-D view of a set and sends image signals of the key subject area to a computer, and means in the computer for computing the actual location of the key subject area and controlling the relative movement of the platform for the correct alignment of the key subject of each 2-D view for printing.

9. The improvement of claim 1 in which the editing and locating means is a video camera with a lens attachment to change the effective focal length of the camera between the locating and editing functions.

10. The improvement of claim 1 in which there are moving means for moving the platform and the negative carrier.

11. The printer of claim 1 in which the location of the key subject in each 2D view is determined by using the following steps:
   a. moving the platform by an approximate distance from the key subject of the first 2-D view to the key subject in the second 2-D view with the approximate distance being computed in the computer by utilizing the following formula:

$$D = d(1+f/k)$$

wherein d is defined as the center-to-center distance between adjacent frames of a set of 2D negatives, f is the focal length of the lenses in the 3D camera used to take the photograph and K is the distance of the key subject from the camera;
   b. with the following information concerning the 2-D images acquired by the locating optical means and conveyed and stored in the computer; P(i,j) is the intensity of the pixel (i,j) of the key subject image and surrounding area of a subsequent 2-D view (Q array) acquired in Step C, and determining the actual distance of the subsequent 2-D view in relation to the first 2-D view by utilizing the following formula Step D1 to properly align the key subject:

$$S(a,b) = \sum_{i}^{n} \sum_{j}^{m} (P(i,j) - Q(i+a, j+b))^2$$

with $$1 < i < n, \ 1 < j < m, \ 0 < a < (N-n), \ 0 < b < (M-m)$$

wherein (n,m) is the dimension of the P array and (N,M) is the dimension of the Q array to be used in the computation of S, and S is a correlation coefficient indicating the matching between the P and Q arrays; with S(a,b) of all different (a,b) in the specified range having been computed in Step D, the value of (a,b) of the minimum S value, providing the actual distance between the key subject in the P array and the key subject in the Q array, with this actual distance being used in Step E for checking the key subject alignment and in Step G for controlling the proper position of the negative carrier prior to printing the 2-D view onto the lenticular print film.

12. The printer of claim 11 in which the following formula is utilized for making a more precise computation of the location of the key subject $$S(a,b) = \sum_{i}^{u} \sum_{j}^{v} [P(i,j) - Q(i+a, j+b)]^2$$

with $$1 < i < u, \ 1 < j < v, \ 0 < a < (U-u), \ 0 < b < (V-v)$$

wherein in uxv is the dimension of the first key subject image (P array) and $U \times V$ is the dimension of a subsequent key subject image (Q array), with Q array being centered at [(N−n−2A)/2, (M−m−2B)/2)] with nearly every pixel being used for making this computation where (A,B) are the value of (a,b) where S (a,b) is the lowest value obtained in Step D, with the lowest value of S in the above equation being used to align the key subjects on the P and Q arrays.

13. The printer of claim 12 in which the following formula is used to check the computations already made to determine if the alignment of the key subject is satisfactory or not wherein the first key subject image is compared with a subsequent key subject image utilizing at least one of the following formulae:

$$D = (1/wW) \sum_{i}^{w} \sum_{j}^{W} abs[P(i,j) - Q(i,j)]$$

$$D = (1/wW) \sum_{i}^{w} \sum_{j}^{W} [P(i,j) - Q(i,j)]^2$$

with $$i=1,w; \ j=1,W$$

with this comparison being used to adjust the alignment accordingly before printing.

14. A method of printing an image array on the photosensitive surface of lenticular print film from a set of 2-D views with a key subject on a negative, said printing utilizing a single stage printer having a negative carrier and a projection lens mounted on a platform for printing said 2-D views onto lenticular print film, with means for facilitating the relative movement between said negative carrier, said lenticular print film, and said platform which method comprises the steps of:
   a. editing the 2-D views and locating the key subject in each 2-D view with editing and locating means which are placed on said platform,
   b. conveying the image information of the key subject to a computer by conveying means,
   c. computing the actual location of the key subject, and
   d. controlling the relative movement of the platform for correct alignment of the key subject in each 2-D view in a set prior to printing.

15. The method of claim 14 in which a video camera is utilized to edit the 2-D view.

16. The method of claim 15 in which a video camera is utilized to locate the key subject.

17. The method of claim 14 in which a video camera is utilized to locate the key subject.

18. The method of claim 17 in which the video camera is located so it only views an enlarged section of the key subject area of each 2-D view and sends image signals of the key subject area to a computer and the computer computes the actual location of the key subject in each 2-D view and controls the movement of said negative carrier, relative to said lenticular print film and said platform, for the correct alignment of the key subject of each 2-D view prior to printing.

19. A method of priming an image array on the photosensitive surface of lenticular print film from a set of 2-D views on a negative, said printing utilizing a single stage printer having a negative carrier and a projection lens mounted on a platform for printing said views onto lenticular print film with means for facilitating the relative movement between said negative carrier, said lenticular print film and said platform, and having a computer controlling the relative movement therebetween, and having optical means for editing the 2-D views and optical means for locating the key subject in each 2-D view, with said editing and locating means being placed on said platform, said method of printing comprising the following steps:

A. editing the first 2-D view of the set on a negative using the editing optical means and selecting the key subject;

B. moving the platform relative to the negative carrier so that the locating optical means reads the key subject in the first 2-D view and conveys the image to a computer which stores the key subject image in the frame grabber;

C. moving the platform relative to the negative to the next 2-D view of a set to a position where the key subject of this view is approximately centered in accordance with a formula for determining the approximate distance to move the platform;

D. computing, based upon the key subject information acquired in Steps B and C and utilizing a formula, the actual location of the key subject in the second view;

E. controlling the relative movement of the platform to the negative carrier to the proper position and determining if the alignment is satisfactory;

F. repeating Steps C, D and E until the actual locations of the key subject in all views of the negative set have been computed; and G. printing all views of the negative set on the lenticular material after moving the 2-D views based on the actual locations of the key subject.

20. The method of claim 19 in which the approximate distance from the key subject in the first 2-D view to the key subject in the second 2-D view in Step C is computed by the computer utilizing the following formula:

$$D = d(1 + f/K)$$

wherein d is defined as the center to center distance between adjacent frames of a set of 2-D negatives, and f is the focal length of the lenses in the 3-D camera used to take the photograph and K is the distance of the key subject from the camera, with the platform being moved by the distance D as computed in accordance with this formula to determine the approximate location of the key subject of the next 2-D view.

21. The method of claim 19 in which an additional Step D1 is used to determine the fine alignment of the key subject in the negative with the computer utilizing a formula for making fine computations based upon the utilization of more information concerning the key subject than utilized in Step D and the movement in Step E being based upon directions obtained on the computation made in Step D1.

22. The method of claim 21 in which the computer is programmed to compare the alignment of the key subject in the first 2-D view with the key subject in the next 2-D view and utilizes a formula for adjusting the fine alignment with the results being used to control the movement in Step E.

23. The method of claim 19 in which the editing means is a color video camera.

24. The method of claim 16 in which the locating means is a video camera.

25. The method of claim 16 in which the following information concerning the 2D images is acquired by the locating optical means and is conveyed and stored in the computer: P(i,j) which is the intensity of the pixel (i,j) of the key subject image and surrounding area of the first 2-D view (P array) acquired in Step B; and Q(i,j) which is the intensity of the pixel (i,j) of the key subject image and surrounding area of a subsequent 2-D view (Q array) acquired in Step C, and wherein with the following formula is utilized to perform a crude alignment, Step D to compute the actual location of the key subject of the subsequent 2-D view in relation to the key subject of the first 2-D view:

$$S(a,b) = \sum_{i}^{n} \sum_{j}^{m} (P(i,j) - Q(i+a, j+b))^2$$

with $$1 < i < n,\ 1 < j < m,\ 0 < a < (N-n),\ 0 < b < (M-m)$$

wherein (n, m) is the dimension of the P array and (N,M) is the dimension of the Q array to be used for the computation of S, and S is a correlation coefficient indicating the matching between the P and Q arrays; with S(a,b) of all different (a,b) in the specified range having been computed in Step D, the value of (a,b) of the minimum S gives the actual distance between the key subject in the P array and the key subject in the Q array, and this actual distance is used in Step E for checking the key subject alignment and in Step G for controlling the proper position of the negative carrier prior to printing the 2-D view onto the lenticular print film.

26. The method of claim 25 in which the formula set forth therein is used to make computation of Step D and the following formula is used to make a fine alignment the computation in an additional Step D1

$$S(a,b) = \sum_{i}^{u} \sum_{j}^{v} (P(i,j) - Q(i+a, j+b))^2$$

with $$1 < i < u,\ 1 < j < v,\ 0 < a < (U-u),\ 0 < b < (V-v)$$

wherein u×v is the dimension of the first key subject image (P array) and U×V is the dimension of the Q array to be used for the computation of S, with the Q array being centered at $((N-n-2A)/2, (M-m-2B)/2)$, where (A,B) are the values of (a,b) where S(a,b) is the lowest value obtained in Step D, with the S(a,b) value of all different (a,b) values in the specified range having been computed in Step D1, where (a,b) of the minimum S value resulting in a finer value of the actual distance between the key subject in the P array and the key subject in the Q array, and this actual distance being used in Step E for checking the key subject alignment and in Step G for controlling the proper position of the negative carrier prior to printing the 2-D view onto the lenticular print film.

27. The method of claim 26 in which the computer checks the computations made in step D and D1 to determine if the alignment is satisfactory or not and if alignment is not satisfactory, the fine alignment computation is repeated, and wherein the determination of whether the alignment is satisfactory is made by comparing the first key subject image with the subsequent key subject image utilizing at least one of the following formula:

$$D = (1/wW) \sum_{i}^{w} \sum_{j}^{W} abs(P(i,j) - Q(i,j))$$

-continued
$$D = (1/wW) \sum_{i}^{w} \sum_{j}^{W} (P(i,j) - Q(i,j))^2$$

with $i=1, w; j=1, W$

Wherein D represents the difference between the alignment of the two key subjects and (1/wW) is a normalization factor and abs represents an absolute.

* * * * *